(12) United States Patent
Vathauer et al.

(10) Patent No.: US 7,001,944 B2
(45) Date of Patent: *Feb. 21, 2006

(54) MINERAL-REINFORCED IMPACT-RESISTANT MODIFIED POLYCARBONATE BLENDS

(75) Inventors: Marc Vathauer, Köln (DE); Andreas Seidel, Dormagen (DE); Detlev Joachimi, Krefeld (DE); Dieter Wittmann, Leverkusen (DE)

(73) Assignee: Bayer Aktiengesellschaft, Levekrusen (DE)

( * ) Notice: Subject to any disclaimer, the term of this patent is extended or adjusted under 35 U.S.C. 154(b) by 320 days.

This patent is subject to a terminal disclaimer.

(21) Appl. No.: 10/277,506

(22) Filed: Oct. 22, 2002

(65) Prior Publication Data

US 2003/0125441 A1  Jul. 3, 2003

(30) Foreign Application Priority Data

Oct. 26, 2001  (DE) ............................... 101 52 317

(51) Int. Cl.
*C08K 3/34* (2006.01)
*C08L 51/00* (2006.01)

(52) U.S. Cl. ............... 524/442; 524/115; 524/126; 524/127; 524/445; 524/448; 524/414; 524/450; 524/504

(58) Field of Classification Search ........... 524/442, 524/448, 445, 450, 414, 504, 126, 127, 115
See application file for complete search history.

(56) References Cited

U.S. PATENT DOCUMENTS

| 4,070,330 | A | * | 1/1978 | Rawlings ............... 523/212 |
| 5,091,461 | A | | 2/1992 | Skochdopole ........... 524/493 |
| 5,674,931 | A | * | 10/1997 | Gallagher et al. ........ 524/414 |
| 5,965,655 | A | | 10/1999 | Mordecai et al. ....... 524/456 |
| 6,362,269 | B1 | | 3/2002 | Ishihata et al. ........ 524/449 |
| 6,380,303 | B1 | * | 4/2002 | Ogoe et al. ............ 525/67 |
| 6,403,683 | B1 | * | 6/2002 | Kobayashi ............. 524/115 |
| 6,653,391 | B1 | * | 11/2003 | Weber et al. ........... 524/504 |
| 6,664,632 | B1 | * | 12/2003 | Duesman et al. ........ 257/750 |
| 6,780,917 | B1 | * | 8/2004 | Hashimoto et al. ...... 524/456 |
| 6,784,233 | B1 | * | 8/2004 | Weber et al. ........... 524/126 |
| 2002/0111428 | A1 | * | 8/2002 | Gaggar et al. .......... 525/67 |
| 2002/0137822 | A1 | | 9/2002 | Seidel et al. ........... 524/127 |

FOREIGN PATENT DOCUMENTS

| EP | 0 639 613 | * | 8/1995 |
| WO | 95/51737 | | 11/1998 |
| WO | WO 02/059204 | * | 8/2002 |

OTHER PUBLICATIONS

Database WPI Section Ch, Week 200003 Derwent Publications Ltd., London, GB; AN 2000-026861 XP002227263 -&JP 11 286599 A (Otsuka Kagaku Yakuhin KK), Oct. 19, 1999 Zusammenfassung.

Database WPI Section Ch, Week 200161 Derwent Publications Ltd., London, GB; AN 2001-544728 XP002227264 -& JP 2001 192545 A (Teijin Kasei Ltd), Jul. 17, 2001 Zusammenfassung.

Patent Abstracts of Japan vol. 1999, No. 12, Oct. 29, 1999 -&JP 11 199767 A (Teijin Chem Ltd), Jul. 27, 1999 Zusammenfassung.

* cited by examiner

*Primary Examiner*—Tae H. Yoon
(74) *Attorney, Agent, or Firm*—Joseph C. Gil; Aron Preis

(57) ABSTRACT

A mineral-filled, impact-resistant thermoplastic molding composition is disclosed. The composition contains at least one resin selected from the group consisting of polycarbonate and polyester carbonate B) impact resistance modifier, and C) wollastonite having carbon content greater than 0.1% relative to the weight of the wollastonite as determined by elemental analysis. Exhibiting high modulus of elasticity and a good toughness, in particular also at low temperatures, the composition is suitable for car body external applications.

22 Claims, No Drawings

MINERAL-REINFORCED IMPACT-RESISTANT MODIFIED POLYCARBONATE BLENDS

FIELD OF THE INVENTION

The present invention relates to thermoplastic molding compositions and more particularly to impact-resistant polycarbonate compositions.

SUMMARY OF THE INVENTION

A mineral-filled, impact-resistant thermoplastic molding composition is disclosed. The composition contains at least one resin selected from the group consisting of polycarbonate and polyester carbonate B) impact resistance modifier, and C) wollastonite having carbon content greater than 0.1% relative to the weight of the wollastonite as determined by elemental analysis. Exhibiting high modulus of elasticity and a good toughness, in particular also at low temperatures, the composition is suitable for car body external applications.

BACKGROUND OF THE INVENTION

Mineral-reinforced polycarbonate/ABS molding compositions are known.

In EP-B 0 391 413 PC/ABS compositions are described having low linear coefficients of thermal expansion as well as high toughness and thermal stability, that contain 4 to 18 wt. % of an inorganic filler whose particles have a mean diameter/thickness ratio of 4 to 24. Such fillers are accordingly platelet-shaped minerals such as talcum or mica. PC/ABS molding compositions containing platelet-shaped minerals are characterized by an insufficient low-temperature toughness and resistance to chemicals.

PC/ABS molding compositions containing fiber-like mineral fillers are also known.

PC/ABS compositions containing wollastonites with a mean fiber length of 5 to 25 μm and a mean particle diameter of 0.1 to 10 μm are disclosed in U.S. Pat. No. 5,965,655. The molding compositions are characterized in particular by improved surface characteristics ("class A surface") and a low coefficient of thermal expansion. The wollastonites that are preferably used have a mean aspect ratio (i.e. a ratio of fiber lengths to fiber diameter) of up to 6. Molding compositions containing such wollastonites as a rule have an insufficient stiffness, i.e. too low a tensile/bending modulus. Furthermore the disclosed molding compositions have a brittle fracture behavior at room temperature.

In WO 98/51737 compositions are disclosed consisting of 65 to 85 parts by weight of aromatic polycarbonate, 10 to 50 parts by weight of rubber-modified graft copolymer and 1 to 15 parts by weight of a mineral filler with a largest characteristic length of 0.1 to 30 μm. Talcum and wollastonite are disclosed as such fillers. Such PC-rich molding compositions have an insufficient low-temperature toughness.

In EP-A 1 038 920 molding compositions are described that contain a special melt polycarbonate, ABS and 15 parts by weight of a wollastonite with a particle diameter of 4 μm and an aspect ratio L/D=20. Such molding compositions have an insufficient low-temperature toughness.

The object of the present invention is accordingly to provide mineral-filled impact-resistant modified polycarbonate compositions that have a high modulus of elasticity and a good toughness, in particular also at low temperatures, and that are therefore suitable in particular for car body external applications. These compositions may also be rendered flame-resistant with flameproofing agents. Flameproofed, impact-resistant modified and mineral-filled polycarbonate compositions that are characterized by a combination of high toughness and rigidity are suitable in particular for thin-wall applications such as notebooks.

DETAILED DESCRIPTION OF THE INVENTION

It has now been found that impact-resistant modified polycarbonate compositions that contain wollastonites having a defined carbon content exhibit the desired properties. In addition to a high modulus of elasticity, good toughness (including at low temperatures) as well as also a good flame resistance imparted by the addition of flameproofing agents, in particular oligophosphates, the compositions according to the invention have a high elongation at break, good processing behavior (high melt flowability) and an excellent ESC behavior (stress-crack resistance under the influence of chemicals).

The present invention provides compositions containing
A) polycarbonate and/or polyester carbonate
B) impact resistance modifier, and
C) wollastonite with a carbon content referred to the wollastonite of greater than 0.1 wt. %, preferably 0.2 to 2 wt. %, particularly preferably 0.3 to 1 wt. %, most particularly preferably 0.3 to 0.6 wt. %, determined by elemental analysis.

Preferred are compositions containing
A) 30 to 85, preferably 35 to 80 and particularly preferably 40 to 70 parts by weight of polycarbonate and/or polyester carbonate,
B) 1 to 50, preferably 2 to 35, particularly preferably 3 to 30 and most particularly preferably 3 to 25 parts by weight of graft polymer with a graft base whose glass transition temperature is <10° C.,
C) 2 to 20, preferably 3 to 18, particularly preferably 4 to 15, especially 6 to 12 parts by weight, most particularly preferably 7 to 10 parts by weight of wollastonite with a carbon content referred to the wollastonite of greater than 0.1 wt. %, preferably 0.2 to 2 wt. %, particularly preferably 0.3 to 1 wt. %, most particularly preferably 0.3 to 0.6 wt. %, determined by elemental analysis.

The composition may contain further components, for example vinyl (co)polymers, polyalkylene terephthalates, flameproofing agents and polymer additives.

Preferred molding compositions formulated from the aforedescribed compositions have a modulus of elasticity greater than 2900 MPa. Compositions that have not been rendered flame-resistant preferably have a tough/brittle transition temperature of at most 0° C.

These constituents and further components that may be used in the compositions according to the invention are described in more detail hereinafter by way of example.

Component A

Suitable aromatic polycarbonates and/or aromatic polyester carbonates of component A according to the invention are known in the literature or may be produced by processes known in the literature (for the production of aromatic polycarbonates see for example Schnell, "Chemistry and Physics of Polycarbonates", Interscience Publishers, 1964 as well as DE-AS 1 495 626, DE-A 2 232 877, DE-A 2 703 376, DE-A 2 714 544, DE-A 3 000 610, DE-A 3 832 396; for the production of aromatic polyester carbonates see for example DE-A 3 077 934).

The production of aromatic polycarbonates is carried out for example by reacting diphenols with carbonic acid halides, preferably phosgene, and/or with aromatic dicarboxylic acid dihalides, preferably benzenedicarboxylic acid dihalides, according to the phase interface process, optionally with the use of chain terminators, for example monophenols, and optionally with the use of trifunctional or higher functional branching agents, for example triphenols or tetraphenols.

Diphenols suitable for the production of the aromatic polycarbonates and/or aromatic polyester carbonates are preferably those of the formula (I)

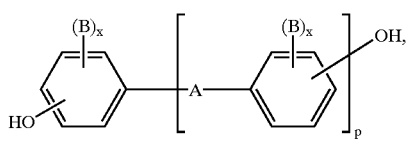

in which
A denotes a single bond, $C_1$ to $C_5$-alkylene, $C_2$ to $C_5$-alkylidene, $C_5$ to $C_6$-cycloalkylidene, —O—, —SO—, —CO—, —S—, —SO$_2$—, $C_6$ to $C_{12}$-arylene, onto which further aromatic rings, optionally containing heteroatoms, may be condensed,
or a radical of the formula (II) or (III)

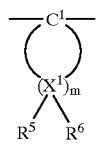

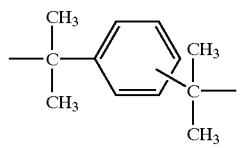

B in each case denotes $C_1$ to $C_{12}$-alkyl, preferably methyl, halogen, preferably chlorine and/or bromine
x in each case independently of one another denotes 0, 1 or 2,
p is 1 or 0, and
$R^5$ and $R^6$ may be chosen individually for each $X^1$, and independently of one another denote hydrogen or $C_1$ to $C_6$-alkyl, preferably hydrogen, methyl or ethyl,
$X^1$ denotes carbon, and
m is a whole number from 4 to 7, preferably 4 or 5, with the proviso that on at least one atom $X^1$, $R^5$ and $R^6$ are simultaneously alkyl.

Preferred diphenols are hydroquinone, resorcinol, dihydroxydiphenols, bis-(hydroxyphenyl)-$C_1$-$C_5$-alkanes, bis-(hydroxyphenyl)-$C_5$-$C_6$-cycloalkanes, bis-(hydroxyphenyl)-ethers, bis-(hydroxyphenyl)-sulfoxides, bis-(hydroxyphenyl)-ketones, bis-(hydroxyphenyl)-sulfones and α,α-bis-(hydroxyphenyl)-diisopropylbenzenes as well as their nuclear-brominated and/or nuclear-chlorinated derivatives.

Particularly preferred diphenols include 4,4'-dihydroxydiphenyl, bisphenol A, 2,4-bis(4-hydroxyphenyl)-2-methylbutane, 1,1-bis-(4-hydroxyphenyl)-cyclohexane, 1,1-bis-(4-hydroxyphenyl)-3,3,5-trimethyl-cyclohexane, 4,4'-dihydroxydiphenyl sulfide, 4,4'-dihydroxydiphenyl sulfone as well as their dibrominated and tetrabrominated or chlorinated derivatives such as for example 2,2-bis(3-chloro-4-hydroxyphenyl)-propane, 2,2-bis(3,5-dichloro-4-hydroxyphenyl)-propane or 2,2-bis(3,5-dibromo-4-hydroxyphenyl)-propane. Particularly preferred is 2,2-bis(4-hydroxyphenyl)-propane (bisphenol A).

The diphenols may be used individually or as arbitrary mixtures with one another. The diphenols are known in the literature or may be obtained by processes known in the literature.

Suitable chain terminators for the production of the thermoplastic, aromatic polycarbonates include for example phenol, p-chlorophenol, p-tert.-butylphenol or 2,4,6-tribromophenol, as well as long-chain alkylphenols such as 4-(1,3-tetramethylbutyl)-phenol according to DE-A 2 842 005, or monoalkylphenols or dialkylphenols with a total of 8 to 20 carbon atoms in the alkyl substituents, such as 3,5-di-tert.-butylphenol, p-iso-octylphenol, p-tert.-octylphenol, p-dodecylphenol, and 2-(3,5-dimethylheptyl)-phenol and 4-(3,5-dimethylheptyl)-phenol. The amount of chain terminators to be used is in general between 0.5 mole % and 10 mole %, referred to the molar sum of the diphenols used in each case.

The thermoplastic, aromatic polycarbonates have mean, weight average molecular weights ($M_w$, measured for example by ultracentrifugation or light-scattering measurements) of 10,000 to 200,000, preferably 15,000 to 80,000.

The thermoplastic, aromatic polycarbonates may be branched in a known manner, and more specifically preferably by the incorporation of 0.05 to 2.0 mole %, referred to the sum of the diphenols used, of trifunctional or higher than trifunctional compounds, for example those with three and more phenolic groups.

Both homopolycarbonates as well as copolycarbonates are suitable. For the production of copolycarbonates of component A according to the invention there may also be used 1 to 25 wt. %, preferably 2.5 to 25 wt. % referred to the total amount of diphenols used, of polydiorganosiloxanes with hydroxyaryloxy terminal groups. These are known (U.S. Pat. No. 3,419,634) and may be prepared according to processes known in the literature. The production of polydiorganosiloxane-containing copolycarbonates is described in DE-A 3 334 782.

Preferred polycarbonates include, besides the bisphenol A homopolycarbonates, also the copolycarbonates of bisphenol A with up to 15 mole %, referred to the molar sum of diphenols, of diphenols other than aforementioned preferred or particularly preferred diphenols, in particular 2,2-bis(3,5-dibromo-4-hydroxyphenyl)propane.

Aromatic dicarboxylic acid dihalides used for the production of aromatic polyester carbonates are preferably the diacid dichlorides of isophthalic acid, terephthalic acid, diphenylether-4,4'-dicarboxylic acid and naphthalene-2,6-dicarboxylic acid.

Particularly preferred are mixtures of the diacid dichlorides of isophthalic acid and terephthalic acid in a ratio between 1:20 and 20:1.

In the production of polyester carbonates a carbonic acid halide, preferably phosgene, is additionally co-used as bifunctional acid derivative.

As chain terminators for the production of the aromatic polyester carbonates there may suitably be used, apart from the already mentioned monophenols, also their chlorocarbonic acid esters as well as the acid chlorides of aromatic monocarboxylic acids that may optionally be substituted by $C_1$ to $C_{22}$-alkyl groups or by halogen atoms, as well as aliphatic $C_2$ to $C_{22}$-monocarboxylic acid chlorides.

The amount of chain terminators is in each case 0.1 to 10 mole %, referred in the case of phenolic chain terminators to moles of diphenol, and in the case of monocarboxylic acid chloride chain terminators, to moles of dicarboxylic acid dichlorides.

The aromatic polyester carbonates may also contain incorporated aromatic hydroxycarboxylic acids.

The aromatic polyester carbonates may be linear as well as, in a known manner, branched (see in this connection DE-A 2 940 024 and DE-A 3 007 934).

As branching agents there may for example be used trifunctional or higher functional carboxylic acid chlorides such as trimesic acid trichloride, cyanuric acid trichloride, 3,3',4,4'-benzophenonetetracarboxylic acid tetrachloride, 1,4,5,8-naphthalenetetra-carboxylic acid tetrachloride or pyromellitic acid tetrachloride, in amounts of 0.01 to 1.0 mole % (referred to dicarboxylic acid dichlorides used) or trifunctional or higher functional phenols such as phloroglucinol, 4,6-dimethyl-2,4,6-tri-(4-hydroxyphenyl)-heptene-2,4,4-dimethyl-2,4,6-tri-(4-hydroxyphenyl)-heptane, 1,3,5-tri-(4-hydroxy-phenyl)-benzene, 1,1,1-tri-(4-hydroxyphenyl)-ethane, tri-(4-hydroxyphenyl)-phenyl-methane, 2,2-bis[4,4-bis-(4-hydroxyphenyl) cyclohexyl]-propane, 2,4-bis-(4-hydroxy-phenylisopropyl)-phenol, tetra-(4-hydroxyphenyl)-methane, 2,6-bis-(2-hydroxy-5-methylbenzyl) 4-methyl-phenol, 2-(4-hydroxyphenyl)-2-(2,4-dihydroxyphenyl)-propane, tetra-(4-[4-hydroxyphenylisopropyl]phenoxy)-methane, 1,4-bis-[4,4'-dihydroxy-triphenyl)methyl]-benzene, in amounts of 0.01 to 1.0 mole %, referred to diphenols used. Phenolic branching agents may be added together with the diphenols, while acid chloride branching agents may be introduced together with the acid dichlorides.

The proportion of carbonate structure units may vary arbitrarily in the thermoplastic, aromatic polyester carbonates. The proportion of carbonate groups is preferably up to 100 mole %, in particular up to 80 mole %, particularly preferably up to 50 mole %, referred to the sum total of ester groups and carbonate groups. Both the ester proportion as well as the carbonate proportion of the aromatic polyester carbonates may be present in the form of blocks or randomly distributed in the polycondensate.

The relative solution viscosity ($\eta_{rel.}$) of the aromatic polycarbonates and polyester carbonates is in the range 1.18 to 1.4, preferably 1.20 to 1.32 (measured in solutions of 0.5 g of polycarbonate or polyester carbonate in 100 ml of methylene chloride solution at 25° C.).

The thermoplastic, aromatic polycarbonates and polyester carbonates may be used alone or in arbitrary mixtures.

Component B

The component B comprises one or more graft polymers of at least one vinyl monomer on one or more graft bases with glass transition temperatures <10° C., preferably <0° C., particularly preferably <−20° C.

Preferred are graft polymers of

B.1 5 to 95 wt. %, preferably 30 to 90 wt. %, of at least one vinyl monomer on

B.2 95 to 5 wt. %, preferably 70 to 10 wt. %, of one or more graft bases with glass transition temperatures of <10° C., preferably <0° C., particularly preferably <−20° C.

The graft base B.2 generally has a mean particle size ($d_{50}$ value) of 0.05 to 10 μm, preferably 0.1 to 5 μm, particularly preferably 0.2 to 1 μm.

Preferred vinyl monomers are selected from the group that includes vinyl aromatic compounds, nuclear-substituted vinyl aromatic compounds, methacrylic acid-($C_1$–$C_8$)-alkyl esters, acrylic acid-($C_1$–$C_8$)-alkyl esters, vinyl cyanides and derivatives of unsaturated carboxylic acids.

Monomers B.1 are particularly preferably mixtures of

B.1.1 50 to 99 wt. % of vinyl aromatic compounds and/or nuclear-substituted vinyl aromatic compounds (such as for example styrene, α-methylstyrene, p-methylstyrene, p-chlorostyrene) and/or methacrylic acid-($C_1$–$C_8$)-alkyl esters (such as methyl methacrylate, ethyl methacrylate) and B.1.2 1 to 50 wt. % of vinyl cyanides (unsaturated nitriles such as acrylonitrile and methacrylonitrile) and/or (meth) acrylic acid —($C_1$–$C_8$)-alkyl esters (such as methyl methacrylate, n-butyl acrylate, tert.-butyl acrylate) and/or derivatives (such as anhydrides and imides) of unsaturated carboxylic acids (for example maleic anhydride and N-phenylmaleimide).

Monomers B.1.1 in particular are selected from the monomers styrene, α-methylstyrene and methyl methacrylate, while preferred monomers B.1.2 are selected from among the monomers acrylonitrile, maleic anhydride and methyl methacrylate.

Most particularly preferred monomers are B.1.1 styrene and B.1.2 acrylonitrile.

Suitable graft bases B.2 for the graft polymers B are for example diene rubbers, EP(D)M rubbers, i.e. those based on ethylene/propylene and optionally diene compounds, as well as acrylate, polyurethane, silicone, chloroprene and ethylene/vinyl acetate rubbers.

Preferred graft bases B.2 are diene rubbers (e.g. based on butadiene, isoprene) or mixtures of diene rubbers or copolymers of diene rubbers or their mixtures with further copolymerisable monomers (e.g. according to B.1.1 and B.1.2), with the proviso that the glass transition temperature of the component B.2 is <10° C., preferably <0° C., particularly preferably <−10° C., especially <−20° C., such as butadiene/styrene copolymers with preferably up to 40 wt. %, in particular up to 30 wt. % of styrene (referred to the graft base).

Polybutadiene rubber is particularly preferred.

Particularly preferred polymers B include ABS polymers (emulsion, bulk and suspension ABS), such as are described for example in DE-A 2 035 390 (=U.S. Pat. No. 3,644,574) or in DE-A 2 248 242 (=GB-PS 1 409 275) or in Ullmanns Enzyklopädie der Technischen Chemie, Vol. 19 (1980), p. 280 ff. The gel proportion of the graft base B.2 is at least 30 wt. %, preferably at least 40 wt. % (measured in toluene).

The graft copolymers B may be produced by free-radical polymerisation, e.g. by emulsion, suspension, solution or bulk polymerisation, preferably by emulsion or bulk polymerisation.

Particularly suitable graft rubbers also include ABS polymers that are produced by redox initiation with an initiator system of organic hydroperoxide and ascorbic acid according to U.S. Pat. No. 4,937,285.

Since in the grafting reaction the graft monomers are, as is known, not necessarily completely grafted onto the graft base, according to the invention graft polymers B are also understood to include those products that are obtained by (co)polymerisation of the graft monomers in the presence of the graft base and that occur during the working-up.

Suitable acrylate rubbers according to B.2 of the polymers B are preferably polymers of acrylic acid alkyl esters, optionally with up to 40 wt. % referred to B.2 of other polymerisable, ethylenically unsaturated monomers. The preferred polymerisable acrylic acid esters include $C_1$ to $C_8$-alkyl esters, for example methyl, ethyl, butyl, n-octyl and 2-ethylhexyl esters; halogenated alkyl esters, preferably halogen-$C_1$–$C_8$-alkyl esters such as chloroethyl acrylate, as well as mixtures of these monomers.

For the crosslinking, monomers containing more than one polymerisable double bond may be co-polymerised. Preferred examples of crosslinking monomers are esters of unsaturated monocarboxylic acids with 3 to 8 C atoms and unsaturated monohydric alcohols with 3 to 12 C atoms, or saturated polyols with 2 to 4 OH groups and 2 to 20 C atoms, such as ethylene glycol dimethacrylate, allyl methacrylate; multiply unsaturated heterocyclic compounds such as trivinyl cyanurate and triallyl cyanurate; polyfunctional vinyl compounds such as divinylbenzenes and trivinylbenzenes; and also triallyl phosphate and diallyl phthalate.

Preferred crosslinking monomers are allyl methacrylate, ethylene glycol dimethacrylate, diallyl phthalate and heterocyclic compounds that contain at least three ethylenically unsaturated groups.

Particularly preferred crosslinking monomers are the cyclic monomers triallyl cyanurate, triallyl isocyanurate, triacryloylhexahydro-s-triazine, and triallylbenzenes. The amount of the crosslinking monomers is preferably 0.02 to 5 wt. %, in particular 0.05 to 2 wt. %, referred to the graft base B.2.

In the case of cyclic crosslinking monomers containing at least three ethylenically unsaturated groups it is advantageous to restrict the amount to below 1 wt. % of the graft base B.2.

Preferred "other" polymerisable, ethylenically unsaturated monomers that apart from the acrylic acid esters may optionally serve for the production of the graft base B.2 include for example acrylonitrile, styrene, α-methylstyrene, acrylamides, vinyl —$C_1$–$C_6$-alkyl ethers, methyl methacrylate, and butadiene. Preferred acrylate rubbers as graft base B.2 are emulsion polymers that have a gel content of at least 60 wt. %.

Further suitable graft bases according to B.2 are silicone rubbers with graft-active sites, such as are described in DE-A 3 704 657, DE-A 3 704 655, DE-A 3 631 540 and DE-A 3 631 539.

The gel content of the graft base B.2 is measured at 25° C. in a suitable solvent (M. Hoffmann, H. Krömer, R. Kuhn, Polymeranalytik I and II, Georg Thieme-Verlag, Stuttgart 1977).

The mean particle size $d_{50}$ is the diameter above and below which in each case 50 wt. % of the particles lie, and can be determined by means of ultracentrifuge measurements (W. Scholtan, H. Lange, Kolloid, Z. and Z. Polymere 250 (1972), 782–796).

Component C

Wollastonites with the carbon contents given above that may be used according to the invention are commercially obtainable, for example under the trade names Nyglos® from NYCO Minerals Inc. Willsboro, N.Y., USA and the brand names Nyglos® 4-10992 or Nyglos® 5-10992.

The carbon content is determined by means of elemental analysis.

Preferred wollastonites have a mean aspect ratio of >6, in particular ≧7, and a mean fiber diameter of 1 to 15 μm, preferably 2 to 10 μm, in particular 4 to 8 μm.

The mean aspect ratio within the meaning of the invention is the ratio of the mean length of the fibers to the mean diameter.

Component D

The following may be contained as further components in the composition:

one or more thermoplastic vinyl (co)polymers D.1 and/or polyalkylene terephthalates D.2.

Suitable as vinyl (co)polymers D.1 are polymers of at least one monomer from the group comprising vinyl aromatic compounds, vinyl cyanides (unsaturated nitriles), (meth)acrylic acid-($C_1$–$C_8$)-alkyl esters, unsaturated carboxylic acids as well as derivatives (such as anhydrides and imides) of unsaturated carboxylic acids. Particularly suitable are (co)polymers of:

D.1.1 50 to 99, preferably 60 to 80 parts by weight of vinyl aromatic compounds and/or nuclear-substituted vinyl aromatic compounds such as for example styrene, α-methylstyrene, p-methylstyrene, p-chlorostyrene and/or methacrylic acid-($C_1$–$C_8$)-alkyl esters such as methyl methacrylate, ethyl methacrylate, and D.1.2 1 to 50, preferably 20 to 40 parts by weight of vinyl cyanides (unsaturated nitriles) such as acrylonitrile and methacrylonitrile and/or (meth)acrylic acid-($C_1$–$C_8$)-alkyl esters (such as methyl methacrylate, n-butyl acrylate, tert.-butyl acrylate) and/or unsaturated carboxylic acids (such as maleic acid) and/or derivatives (such as anhydrides and imides) of unsaturated carboxylic acids (for example maleic anhydride and N-phenylmaleimide).

The (co)polymers D.1 are resinous, thermoplastic and rubber-free.

Particularly preferred is the copolymer of D.1.1 styrene and D.1.2 acrylonitrile.

The (co)polymers according to D.1 are known and can be produced by free-radical polymerisation, in particular by emulsion, suspension, solution or bulk polymerisation. The (co)polymers preferably have mean molecular weights $M_w$ (weight average, determined by light scattering or sedimentation measurements) between 15,000 and 200,000.

The polyalkylene terephthalates of the component D.2 are reaction products of aromatic dicarboxylic acids or their reactive derivatives such as dimethyl esters or anhydrides, and aliphatic, cycloaliphatic or aralipahtic diols, as well as mixtures of these reaction products.

Preferred polyalkylene terephthalates contain at least 80 wt. %, preferably at least 90 wt. %, referred to the dicarboxylic acid component, of terephthalic acid radicals and at least 80 wt. %, preferably at least 90 mole %, referred to the diol component, of ethylene glycol radicals and/or butanediol-1,4 radicals.

The preferred polyalkylene terephthalates may in addition to terephthalic acid esters contain up to 20 mole %, preferably up to 10 mole %, of radicals of other aromatic or cycloaliphatic dicarboxylic acids with 8 to 14 C atoms or aliphatic dicarboxylic acids with 4 to 12 C atoms, such as radicals of phthalic acid, isophthalic acid, naphthalene-2,6-dicarboxylic acid, 4,4'-diphenyldicarboxylic acid, succinic acid, adipic acid, sebacic acid, azeleic acid and cyclohexanediacetic acid.

The preferred polyalkylene terephthalates may in addition to ethylene glycol radicals or butanediol-1,4 radicals contain up to 20 mole %, preferably up to 10 mole %, of other aliphatic diols with 3 to 12 C atoms or cycloaliphatic diols with 6 to 21 C atoms, for example radicals of propanediol-1,3,2-ethylpropanediol-1,3,neopentyl glycol, pentanediol-1, 5,hexanediol-1,6,cyclohexanedimethanol-1,4,3-ethylpentanediol-2,4,2-methylpentanediol-2,4,2,2,4-trimethylpentanediol-1,3,2-ethylhexanediol-1,3,2,2-diethylpropanediol-1,3,hexanediol-2,5,1,4-di-(β- hydroxyethoxy)-benzene, 2,2-bis-(4-hydroxycyclohexyl)-propane, 2,4-dihydroxy-1,1,3,3-tetramethylcyclobutane, 2,2-bis-(4-β-hydroxyethoxyphenyl)-propane and 2,2-bis-(4-hydroxypropoxyphenyl)-propane (DE-A 2 407 674, 2 407 776, 2 715 932).

The polyalkylene terephthalates may be branched by the incorporation of relatively small amounts of trihydric or tetrahydric alcohols or tribasic or tetrabasic carboxylic acids, for example according to DE-A 1 900 270 and U.S. Pat. No. 3,692,744. Examples of preferred branching agents are trimesic acid, trimellitic acid, trimethylolethane and trimethylolpropane, and pentaerythritol.

Particularly preferred are polyalkylene terephthalates that have been obtained solely from terephthalic acid and its reactive derivatives (e.g. its dialkyl esters) and ethylene glycol and/or butanediol-1,4, and mixtures of these polyalkylene terephthalates.

Mixtures of polyalkylene terephthalates contain 1 to 50 wt. %, preferably 1 to 30 wt. %, of polyethylene terephthalate and 50 to 99 wt. %, preferably 70 to 99 wt. %, of polybutylene terephthalate.

The polyalkylene terephthalates that are preferably used generally have an intrinsic viscosity of 0.4 to 1.5 dl/g, preferably 0.5 to 1.2 dl/g, measured in phenol/o-dichlorobenzene (1:1 parts by weight) at 25° C. in an Ubbelohde viscosimeter.

The polyalkylene terephthalates may be produced according to known methods (see e.g. Kunststoff-Handbuch, Vol. VIII, p. 695 ff, Carl-Hanser-Verlag, Munich 1973).

The component D may be contained in the compositions according to the invention in an amount of preferably 0 to 50 parts by weight, particularly preferably up to 30 parts by weight, and most particularly preferably up to 20 parts by weight.

Component E

The compositions may be made flame-resistant by adding suitable additives. As flameproofing agents there may be mentioned by way of example halogenated compounds, in particular those based on chlorine and bromine, phosphorus-containing compounds, as well as silicon compounds, in particular silicone compounds.

The compositions preferably include phosphorus-containing flameproofing agents such as monomeric and oligomeric phosphoric acid and phosphonic acid esters, phosphonatamines and phosphazenes, in which connection mixtures of several components selected from one or various of these may be used as flameproofing agents. Other phosphorus compounds not specifically mentioned here may also be used alone or in arbitrary combinations together with other flameproofing agents.

Preferred monomeric and oligomeric phosphoric acid and/or phosphonic acid esters are phosphorus compounds of the general formula (IV)

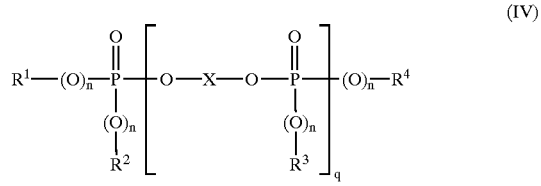

(IV)

in which $R^1$, $R^2$, $R^3$ and $R^4$ independently of one another denote $C_1$ to $C_8$-alkyl or $C_5$ to $C_6$-cycloalkyl, $C_6$ to $C_{20}$-aryl or $C_7$ to $C_{12}$-aralkyl, that are optionally substituted by alkyl, preferably $C_1$ to $C_4$-alkyl, and/or by halogen, preferably chlorine or bromine n independently of one another is 0 or 1 q is 0 to 30, and

X denotes a mononuclear or polynuclear aromatic radical with 6 to 30 C atoms, or a linear or branched aliphatic radical with 2 to 30 C atoms, which may be OH-substituted and may contain up to 8 ether bonds.

Preferably $R^1$, $R^2$, $R^3$ and $R^4$ independently of one another denote $C_1$ to $C_4$-alkyl, phenyl, naphthyl or phenyl-$C_1$–$C_4$-alkyl. The aromatic groups $R^1$, $R^2$, $R^3$ and $R^4$ may for their part be substituted by halogen and/or alkyl groups, preferably chlorine, bromine and/or $C_1$ to $C_4$-alkyl. Particularly preferred aryl radicals are cresyl, phenyl, xylenyl, propylphenyl or butylphenyl, as well as the corresponding brominated and chlorinated derivatives thereof.

X in the formula (IV) preferably denotes a mononuclear or polynuclear aromatic-radical with 6 to 30 C atoms. This is preferably derived from diphenols of the formula (I).

n in the formula (IV) may independently of one another be 0 or 1, and preferably n is equal to 1.

q denotes values from 0 to 30. When using mixtures of various components of the formula (IV) mixtures preferably having numerically averaged q values from 0.3 to 20, particularly preferably 0.5 to 10, especially 0.5 to 6, and most particularly preferably 0.6 to 2 are employed.

X preferably denotes

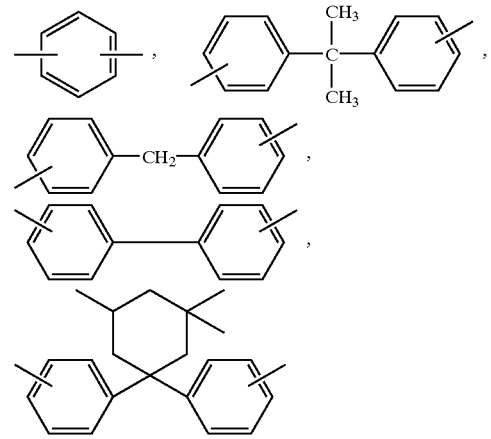

or their chlorinated or brominated derivatives, and in particular X is derived from resorcinol, hydroquinone, bisphenol A or diphenylphenol. Particularly preferably X is derived from bisphenol A.

As component E according to the invention there may be used monophosphates (q=0), oligophosphates (q=1–30) or mixtures of monophosphates and oligophosphates.

Monophosphorus compounds of the formula (IV) include in particular tributyl phosphate, tris-(2-chloroethyl)-phosphate, tris-(2,3-dibromopropyl)-phosphate, triphenyl phosphate, tricresyl phosphate, diphenylcresyl phosphate, diphenyloctyl phosphate, diphenyl-2-ethylcresyl phosphate, tri-(isopropylphenyl)-phosphate, halogen-substituted aryl phosphates, methylphosphonic acid dimethyl ester, methylphosphenic acid diphenyl ester, phenylphosphonic acid diethyl ester, triphenylphosphine oxide or tricresylphosphine oxide.

The phosphorus compounds according to component E are known (see for example EP-A 0 363 608, EP-A 0 640 655) or may be prepared by known methods (e.g. Ullmanns Enzyklopädie der Technischen Chemie, Vol. 18, p. 301 ff. 1979; Houben-Weyl, Methoden der Organischen Chemie, Vol. 12/1, p. 43; Beilstein Vol. 6, p. 177).

The mean q values may be found by determining the composition of the phosphate mixture (molecular weight distribution) by means of an appropriate method (gas chromatography (GC), high pressure liquid chromatography (HPLC), gel permeation chromatography (GPC)) and calculating therefrom the mean values for q.

In addition phosphonatamines and phosphazenes may be used as flameproofing agents.

The flameproofing agents may be used alone or in arbitrary mixtures with one another or mixed with other flameproofing agents.

The component E may be contained in the composition according to the invention in an amount of preferably 1 to 40 parts by weight, particularly preferably 2 to 30 parts by weight, and most particularly preferably 2 to 20 parts by weight.

Component F

The flameproofing agents corresponding to component E are often used in combination with so-called anti-drip agents, which reduce the tendency of the material to form burning droplets in the event of fire. By way of example there may be mentioned here compounds from the classes of substances comprising fluorinated polyolefins, silicones as well as aramide fibers. These may also be employed in the compositions according to the invention. Fluorinated polyolefins are preferably used as anti-drip agents.

Fluorinated polyolefins are known and are described for example in EP-A 0 640 655. They are marketed by DuPont for example under the trade name Teflon® 30N.

The fluorinated polyolefins may be used as such as well as in the form of a coagulated mixture of emulsions of the fluorinated polyolefins with emulsions of the graft polymers (component B) or with an emulsion of a copolymer, preferably based on styrene/acrylonitrile, in which the fluorinated polyolefin is mixed as an emulsion with an emulsion of the graft polymer or of the copolymer and is then coagulated.

Furthermore the fluorinated polyolefins may be employed as pre-compound with the graft polymer (component B) or with a copolymer according to D.1, preferably based on styrene/acrylonitrile. The fluorinated polyolefins are mixed as powder with a powder or granular material of the graft polymer or copolymer and compounded in the melt in general at temperatures from 200° to 330° C. in conventional equipment such as internal kneaders, extruders or double-shaft screw extruders.

The fluorinated polyolefins may also be used in the form of a master batch that is produced by emulsion polymerisation of at least one monoethylenically unsaturated monomer in the presence of an aqueous dispersion of the fluorinated polyolefin. Preferred monomer components are styrene, acrylonitrile and their mixtures. The polymer is used after precipitation with an acid and subsequent drying as a flowable powder.

The coagulates, pre-compounds or master batches usually have solids contents of fluorinated polyolefin of 5 to 95 wt. %, preferably 7 to 60 wt. %.

The component F may be contained in the composition according to the invention in an amount of preferably 0.05 to 10 parts by weight, particularly preferably 0.1 to 5 parts by weight and most particularly preferably 0.3 to 5 parts by weight, the content of fluorinated polyolefin per se in the composition preferably being 0.05 to 1 part by weight, in particular 0.1 to 0.5 part by weight.

Component G (Further Additives)

The compositions according to the invention may furthermore contain at least one of the conventional additives such as lubricants and mold release agents, for example pentaerythritol tetrastearate, nucleating agents, antistatics, stabilizers, and further fillers and reinforcing substances as well as dyes and pigments.

All figures relating to parts by weight in this application are standardised so that the sum total of the parts by weight of the components A) to G) in the composition is 100.

The compositions according to the invention are produced by mixing the respective constituents in a known manner and melt-compounding and melt-extruding the compositions at temperatures of 200° C. to 300° C. in conventional equipment such as internal kneaders, extruders and double-shaft screw extruders.

The mixing of the individual constituents may be carried out in a known manner successively as well as simultaneously, and more specifically at about 20° C. (room temperature) as well as at higher temperatures.

The molding compositions according to the invention may be used to produce all types of molded parts. These may be produced by injection molding, extrusion and blow molding processes. A further form of processing is the production of molded parts by thermoforming from previously fabricated sheets or films, and the process of in mold decoration (IMD).

Examples of such molded parts are films, profiled sections, all types of housing parts, e.g. for domestic appliances such as juice presses, coffee-making machines, mixers; for office equipment such as monitors, printers, copiers; automobile external and internal parts; panels, pipes, electrical installation ducting, windows, doors and further profiled sections for the building and construction sector (internal and external applications), as well as electrical and electronics components such as switches, plugs and sockets.

In particular the molding compositions according to the invention may also be used for example to produce the following molded parts:

Internal structural parts for tracked vehicles, boats, aircraft, buses and other vehicles, external bodywork parts in the automotive sector, housings for electrical equipment containing small transformers, housings for information processing and transmission equipment, housings and casings for medical equipment, massage equipment and housings therefor, children's toys, two-dimensional wall elements, housings for safety devices, thermally insulated transportation containers, devices for holding or looking after small animals, molded parts for sanitaryware and bathroom fittings, cover gratings for ventilator openings, molded parts for garden sheds and equipment housings, and housings for gardening tools.

The following examples serve to illustrate the invention in more detail.

EXAMPLES

Components

A1: Linear PC based on bisphenol A with a relative solution viscosity of 1.28 measured in $CH_2Cl_2$ as solvent at 25° C. and a concentration of 0.5 g/100 ml A2: Linear PC based on bisphenol A with a relative solution viscosity of 1.24 measured in $CH_2Cl_2$ as solvent at 25° C. and a concentration of 0.5 g/100 ml B: Graft polymer of 40 parts by weight of a copolymer of styrene and acrylonitrile in a ratio of 73:27 on 60 parts by weight of particulate crosslinked polybutadiene rubber (mean particle diameter $d_{50}=0.3$ μm) produced by emulsion polymerisation C-W1: Wollastonite with a C content of 0.49 wt. % and a $d_{50}$ of 4.8 μm and an aspect ratio of 8:1 (Nyglos® 4 10992, NYCO Minerals Inc., Willsboro, N.Y., USA)

C-W2: Wollastonite with a C content of 0.40 wt. % and a $d_{50}$ of 6.5 μm and an aspect ratio of 13:1 (Nyglos® 5 10992, NYCO Minerals Inc., Willsboro, N.Y., USA)

C-W3 (Comparison): Wollastonite with a C content of <0.1 wt. % and a $d_{50}$ of 2.5 μm and an aspect ratio of 5:1 (NYAD M3, NYCO Minerals Inc., Willsboro, N.Y., USA)

C-W4 (Comparison): Wollastonite with a C content of <0.1 wt. % and a $d_{50}$ of 6.5 μm and an aspect ratio of 13:1 (Nyglos® 5, NYCO Minerals Inc., Willsboro, N.Y., USA)

C-W5 (Comparison): Wollastonite with a C content of <0.1 wt. % and a $d_{50}$ of 4.8 μm and an aspect ratio of 8:1 (Nyglos® 4, NYCO Minerals Inc., Willsboro, N.Y., USA)

C-T (Comparison): Naintsch A3 (Naintsch Mineralwerke GmbH, Graz, Austria), talcum with a mean particle diameter ($d_{50}$) according to the manufacturer's information of 1.2 μm.

D: Styrene/acrylonitrile copolymer with a styrene/acrylonitrile weight ratio of 72:28 and an intrinsic viscosity of 0.55 dl/g (measured in dimethylformamide at 20° C.)

E: Oligophosphate:

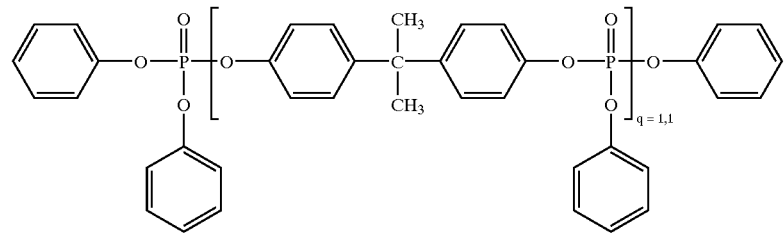

In order to determine the mean q value the proportions of the monomeric and oligomeric phosphates are first of all determined by HPLC measurements:

Column type: LiChrosorp RP-8
Eluting agent in the gradient:
acetonitrile/water 50:50 to 100:0
Concentration 5 mg/ml The number-weighted mean values are then calculated by known methods from the proportions of the individual components, i.e. monophosphates and oligophosphates.

Component F

Tetrafluoroethylene polymer as a coagulated mixture of a SAN graft polymer emulsion according to component B in water and a tetrafluoroethylene polymer emulsion in water. The weight ratio of graft polymer B to tetrafluoroethylene polymer F in the mixture is 90 wt. % to 10 wt. %. The tetrafluoroethylene polymer emulsion has a solids content of 60 wt. %, and the mean particle diameter is between 0.05 and 0.5 μm. The SAN graft polymer emulsion has a solids content of 34 wt. % and a mean latex particle diameter of 0.4 μm.

In order to produce the component F the emulsion of the tetrafluoroethylene polymer (Teflon® 30N, DuPont) is mixed with the emulsion of the SAN graft polymer B and stabilized with 1.8 wt. %, referred to polymer solids, of phenolic antioxidants. The mixture is coagulated at 85° to 95° C. with an aqueous solution of $MgSO_4$ (Epsom salt) and acetic acid at pH 4 to 5, filtered and washed until practically free of electrolytes, following which it is freed from most of the water by centrifugation and then dried at 100° C. to a powder. This powder may then be compounded with the further components in the described aggregates.

G1: PETS (pentaerythritol tetrastearate)
G2: phosphite stabilizer

The carbon content of the wollastonites is determined by means of elemental analysis. A 24-hour extraction of the wollastonites C-W1 and C-W2 with chloroform yielded only the following amounts of extracted substance (in each case referred to the total amount of wollastonite used):

C-W1: 0.06 wt. %
C-W2: 0.03 wt. %

These values confirm that the carbon is in the form of chemically bound carbon and accordingly no physical mixture of mineral and a carbon-containing compound is present.

The stress crack behavior (ESC behavior) is investigated on rods with dimensions 80 mm×10 mm×4 mm. A mixture of 50 vol. % of toluene and 50 vol. % of isooctane, or of 60 vol. % of toluene and 40 vol. % of isopropanol is used as test medium with flameproofed compositions. The test specimens are subjected to a preliminary stretching ($\epsilon_x=0.2$ to 2.4%) by means of a circular arc-shaped template and are stored at room temperature in the respective test medium. The ESC behavior is evaluated on the basis of the minimum preliminary stretching at which the rod fractures within 5 minutes in the test medium.

The notch-impact resistance $a_k$ and the impact resistance $a_n$ are determined according to ISO 180/1 A and ISO 180/1 U. In order to determine the tough-brittle transition temperature the notch-impact resistance values $a_k$ are measured and evaluated at different temperatures. Starting from room temperature the test temperature is reduced in 5° steps until a brittle fracture is observed.

The modulus of elasticity and the elongation at break were determined in the tensile test according to ISO 527.

The fire behavior of the flameproofed specimens was measured according to UL-Subj. 94 V on rods of dimensions 127 mm×12.7 mm×0.8 mm that had been produced in an injection molding machine at 240° C.

The melt viscosity is determined at 260° C. and at a shear rate of 1,000 $s^{-1}$ according to DIN 54 811.

A summary of the properties of the compositions according to the invention and molded parts fabricated therefrom is given in Tables 1 and 2.

Table 1 confirms that the molding compositions (Examples 1 and 2) reinforced with the special wollastonites having defined carbon contents are characterized by a significantly better elongation at break, better low temperature toughness (tough/brittle transition) and stress-crack resistance compared to the comparison examples, and at the same time have a high tensile strength and modulus of elasticity.

TABLE 1

| Components | 1 | 2 | Comp. V1 | Comp. V2 | Comp. V3 | Comp. V4 |
|---|---|---|---|---|---|---|
| A1 | 55.1 | 55.1 | 55.1 | 55.1 | 55.1 | 55.1 |
| B | 14.7 | 14.7 | 14.7 | 14.7 | 14.7 | 14.7 |
| D | 22.0 | 22.0 | 22.0 | 22.0 | 22.0 | 22.0 |
| C-W1 | 7.4 | | | | | |
| C-W2 | | 7.4 | | | | |
| C-W3 | | | 7.4 | | | |
| C-W4 | | | | 7.4 | | |
| C-W5 | | | | | 7.4 | |
| C-T | | | | | | 7.4 |
| G1 | 0.7 | 0.7 | 0.7 | 0.7 | 0.7 | 0.7 |
| G2 | 0.1 | 0.1 | 0.1 | 0.1 | 0.1 | 0.1 |
| Properties | | | | | | |
| Mod. elasticity [MPa] | 3000 | 3000 | 2600 | 2850 | 2850 | 3000 |
| Elongation at break [%] | 87 | 81 | 29 | 33 | 30 | 58 |
| Tough/brittle transition temperature [° C.] | −10 | 0 | 15 | 15 | 15 | 5 |
| ESC fracture after 5 minutes at $\epsilon_x$ [%] | 1.0 | 1.0 | 0.6 | 0.8 | 0.6 | 0.6 |

TABLE 2

Molding compositions and their properties

| | Comparison V5 | 3 |
|---|---|---|
| Components [parts by weight] | | |
| A2 (PC) | 63.2 | 63.2 |
| B (graft) | 4.9 | 4.9 |
| D (SAN) | 4.9 | 4.9 |
| E (BDP) | 12.8 | 12.8 |
| F (Teflon master batch) | 3.9 | 3.9 |
| C-W4 (Nyglos 5) | 9.8 | — |
| C-W2 (Nyglos 5 10992) | — | 9.8 |
| G1 (PETS) | 0.4 | 0.4 |
| G2 (phosphite stabilizer) | 0.1 | 0.1 |
| Properties | | |
| $a_n$ [kJ/m$^2$] | 130 | 183 |
| Modulus of elasticity [MPa] | 3532 | 3785 |
| Elongation at break [%] | 21.9 | 27.2 |
| Melt viscosity [260° C./1000s$^{-1}$] | 151 | 143 |
| ESC behavior | | |
| Fracture at $\epsilon_x$ [%] | 2.4 | 2.4 |
| UL 94 V at 0.8 mm | V-0 | V-0 |

The data in Table 2 show that also in the case of flameproofed, impact-resistant modified PC molding compositions improved toughness values, elongation at break and moduli of elasticity combined with excellent flowability and outstanding ESC behavior can be achieved by using the special wollastonites with defined carbon contents.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition comprising
    A) at least one resin selected from the group consisting of polycarbonate and polyester carbonate
    B) impact resistance modifier, and
    C) wollastonite having carbon content greater than 0.1% relative to the weight of the wollastonite as determined by elemental analysis.

2. The composition according to claim 1, in which the carbon content is 0.2 to 2%.

3. The composition according to claim 1, in which the carbon content is 0.3 to 0.6%.

4. The composition according to claim 1 wherein the resin is present in an amount of 30 to 85 parts by weight and the impact modifier is present in an amount of 1 to 50 parts by weight and the wollastonite is present in an amount of 2 to 20 parts by weight, the impact modifier being a graft polymer having a graft base the glass transition temperature of the graft base being lower than 10° C., the sum total of the parts by weight of all components being 100.

5. The composition according to claim 1 further containing at least one member selected from the group consisting of vinyl (co)polymer, polyalkylene terephthalate, flameproofing agent lubricant, mold release agent, nucleating agent, antistatic, stabilizer, filler, reinforcing substance dyes and pigments.

6. The composition according to claim 1 in which the wollastonite has a mean aspect ratio greater than 6 and a mean fiber diameter of 1 to 15 µm.

7. The composition according to claim 1 in which the wollastonite has a mean aspect ratio ≧7 and a mean fiber diameter of 4 to 8 µm.

8. The composition according to claim 1 wherein impact resistance modifier is a graft polymer of at least one vinyl monomer, B.1 grafted on a graft base, B.2, the graft base having glass transition temperature <−20° C.

9. The composition according to claim 8, wherein the graft polymer is of 5 to 95 percent of at least one vinyl monomer, B.1, grafted on 95 to 5 percent of a graft base, B.2, the percent both occurences being relative to the weight of the graft polymer.

10. The composition according to claim 9, in which the vinyl monomer, B.1 is at lease one member selected from the group consisting of vinyl aromatic compound, nuclear-substituted vinyl aromatic compound, methacrylic acid-($C_1$–$C_8$)-alkyl ester, acrylic acid-($C_1$–$C_8$)-alkyl ester, vinyl cyanide and a derivatives of unsaturated carboxylic acid.

11. Composition according to claim 10, in which the vinyl monomer, B.1 is a mixture of
    B.1.1 50 to 99 wt. % (referred to B.1) of at least one monomer selected from the group consisting of vinyl aromatic compound, nuclear-substituted vinyl aromatic compound, methacrylic acid-($C_1$–$C_8$)-alkyl ester and acrylic acid-($C_1$–$C_8$)-alkyl ester and
    B.1.2 1 to 50 wt. % (referred to B.1) of at least one monomer selected from the group consisting of vinyl cyanide, methacrylic acid-($C_1$–$C_8$)-alkyl ester, acrylic acid-($C_1$–$C_8$)-alkyl ester, and derivative of unsaturated carboxylic acid.

12. The composition according to claim 11, in which B.1.1 is styrene and B.1.2 is acrylonitrile.

13. The composition according to claim 8 in which the graft base B.2 is at least one rubber selected from the group consisting of diene, acrylate, silicone and EPDM.

14. The composition according to claim 13, in which the graft base is polybutadiene or a butadiene/styrene copolymer.

15. The composition according to claim 5, in which the vinyl (co)polymer is formed from
- 50 to 99 wt. % (referred to the weight of the vinyl (co)polymer) of at least one monomer selected from the group consisting of vinyl aromatic compound, nuclear-substituted vinyl aromatic compound, methacrylic acid-($C_1$–$C_8$)-alkyl ester and acrylic acid-($C_1$–$C_8$)-alkyl ester, and
- 1 to 50 wt. % (referred to the weight of the vinyl (co)polymer) of at least one monomer selected from the group consisting of vinyl cyanide, methacrylic acid -($C_1$–$C_8$)-alkyl ester, acrylic acid-($C_1$–$C_8$)-alkyl ester and derivative of unsaturated carboxylic acid.

16. The composition according to claim 1 further containing a phosphorus compound of the formula (IV)

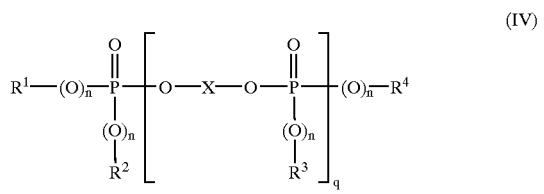

in which $R^1$, $R^2$, $R^3$ and $R^4$ independently of one another in each case denote $C_1$ to $C_8$-alkyl, $C_5$ to $C_6$-cycloalkyl, $C_6$ to $C_{20}$-aryl or $C_7$ to $C_{12}$-aralkyl in each case optionally substituted by alkyl and/or halogen, n independently of one another is 0 or 1 q is 0 to 30, and

X denotes a mononuclear or polynuclear aromatic radical with 6 to 30 C atoms, or a linear or branched aliphatic radical with 2 to 30 C atoms, which may be OH-substituted and may contain up to 8 ether bonds.

17. The composition according to claim 16, in which X denotes a member selected from the group consisting of

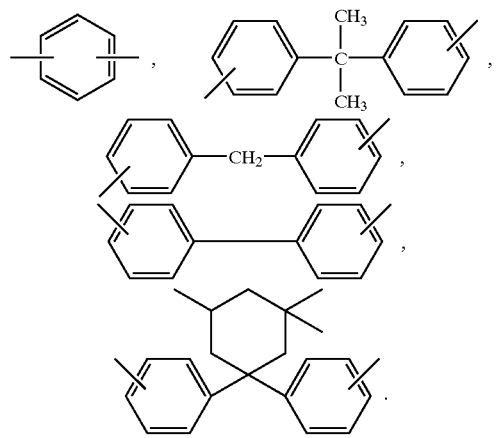

18. The composition according to claim 16 containing
- 35 to 80 parts by weight of component A)
- 2 to 35 parts by weight of component B)
- 3 to 18 parts by weight of component C)
- 1 to 40 parts by weight of the phosphorus compound, and
- 0.05 to 1 part by weight of a fluorinated polyolefin, in which the sum total of the parts by weight of the components is 100.

19. The composition according to claim 1 further containing at least one additive selected from the group consisting of lubricant, mold release agent, nucleating agent, antistatic, stabilizer, filler, reinforcing substance, dyes and pigments.

20. A method of using the composition according to claim 1 comprising producing a molded article.

21. The method of claim 20 wherein article is an external part of a vehicle body.

22. A molded article comprising the composition of claim 1.

* * * * *